April 5, 1932.  K. M. RONAN  1,852,129
STREAM LINE BOOT FOR AIRPLANES
Filed Sept. 13, 1930
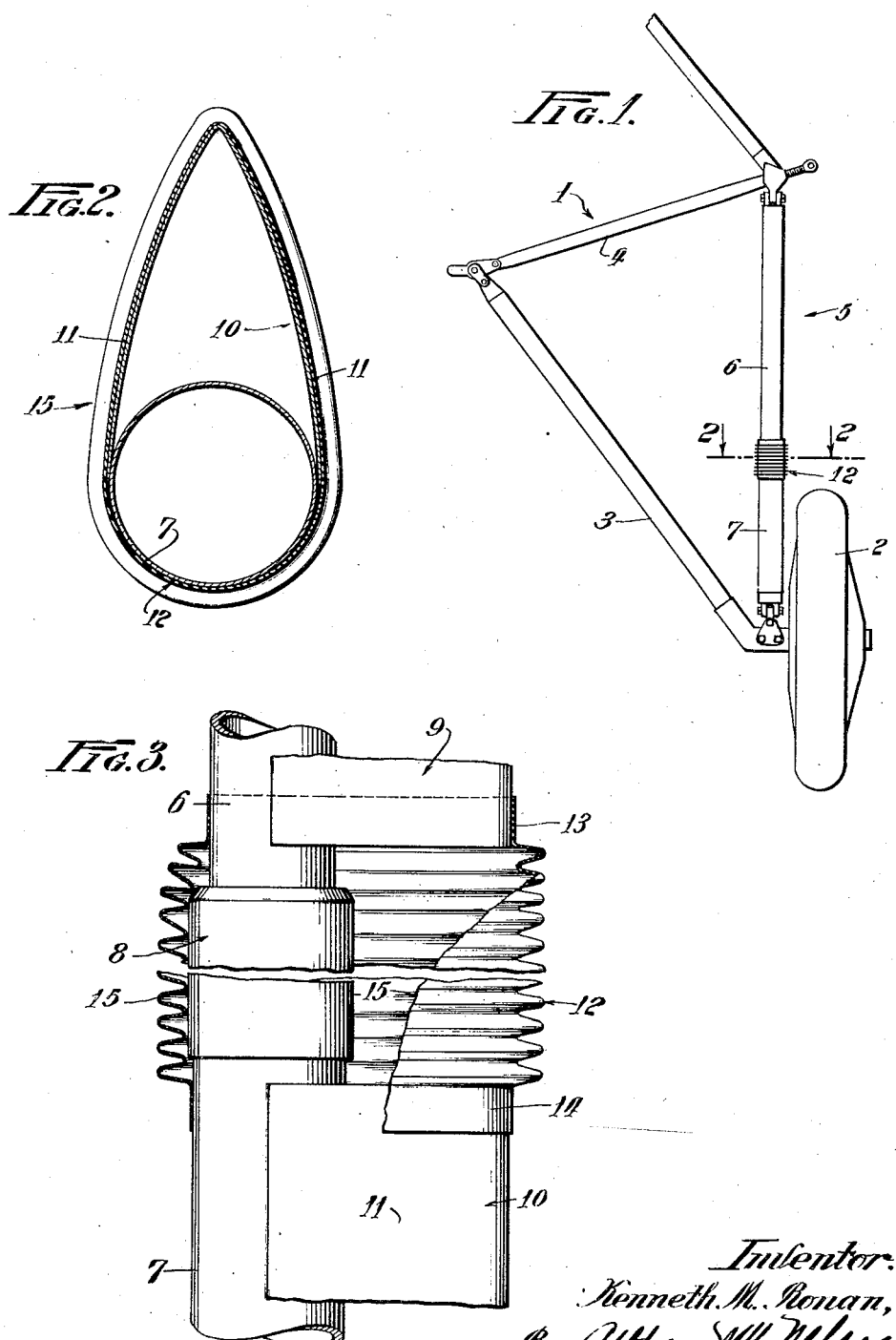

Patented Apr. 5, 1932

1,852,129

UNITED STATES PATENT OFFICE

KENNETH M. RONAN, OF WAYNE, MICHIGAN, ASSIGNOR TO MANNING & CO., OF CHICAGO, ILLINOIS, A CORPORATION OF ILLINOIS

STREAM LINE BOOT FOR AIRPLANES

Application filed September 13, 1930. Serial No. 481,838.

This invention relates to improvements in stream line boots for airplanes and it consists of the matters hereinafter described and more particularly pointed out in the appended claims.

The primary object of the invention is to provide a simple and efficient device for stream lining the telescopic joint or connection in the oleo strut or hydraulic leg forming a part of the landing gear of an airplane, which device is capable of maintaining its stream line cross section under the action of the expansion and contraction of the strut, when such strut is in actual operation as when the airplane is landing, taxiing or taking off.

Another object of the invention is to provide a device of this kind which is so formed at its ends as to snugly grip the respective movable strut parts with which it is associated and is circumferentially pleated or corrugated between said ends to accommodate such relative movement between said strut parts and at the same time enclose and protect the stuffing box structure on the end of one of said parts, against the entrance of such foreign matter as would interfere with the intended function of the strut.

The above mentioned objects of the invention as well as others, together with the many advantages thereof, will more fully appear as I proceed with my specification.

In the drawings:—

Fig. 1 is a view in front elevation of a part of the landing gear of an airplane, including an oleo strut or hydraulic leg provided with my improved boot.

Fig. 2 is a horizontal detail sectional view through the same on an enlarged scale as taken on the line 2—2 of Fig. 1.

Fig. 3 is a view partly in side elevation and partly in longitudinal section through the improved boot and parts of the oleo strut with which said boot is associated.

Referring now in detail to that embodiment of the invention illustrated in the accompanying drawings:—1 indicates as a whole the portion of the landing gear on the left hand side of an airplane which gear includes a wheel 2 mounted on the end of an axle tube 3. This tube is connected at one end to the inner end of a strut 4 the outer end of which is connected to the other end of the axle tube, inside the wheel by an upright oleo tube or hydraulic leg 5. Said oleo strut includes top and bottom parts 6 and 7, the former telescoping in the latter, which has a stuffing box 8 on its associated end. The said parts of the oleo strut coact to provide a hydraulic shock absorber arranged in said strut to absorb and dissipate the shocks between the wheel and fuselage (not shown) in landing, taxiing and taking off.

To reduce wind resistance of said strut, both the top and bottom tubes thereof are stream lined by means of a fairing strip 9 and 10 respectively. Each fairing strip is preferably of a substantially V-shaped cross section and each comprises side walls 11 the free margins of which are spot welded to opposite sides of the associated tube, the other margins being connected together by a rounded edge to form the trailing edge of the fairing.

It is pointed out that the fairing for each tube part terminates a short distance on each side of the stuffing box 8 on the oleo strut, thus leaving the box itself as well as portions of the top and bottom tubes of the strut devoid of such stream lining. In this connection it is also pointed out that the stuffing box is exposed and unprotected so far as the entrance of foreign matter thereinto is concerned.

To stream line the strut at this place as well as to prevent the entrance of foreign particles into the tube 7 through the stuffing box, I provide a boot indicated as a whole as at 12. Said boot which is preferably made of rubber, is tubular in form and is of a horizontal cross section approximating that of both tubes and associated fairings of the strut.

The boot has plain or unpleated ends or necks 13 and 14 respectively and an intermediate body 15 which is transversely pleated or corrugated whereby it is capable of quite a substantial extensible and contractable movement to permit of a considerable change in length without effecting its major and minor transverse dimensions. The necks 13 and 14 are somewhat smaller in diameter than the oleo strut tubes 6 and 7 with which they engage so that in applying the boot, said necks are somewhat stretched to snugly engage and grip upon their associated tube parts. When the boot is in position the neck 13 snugly grips upon the bottom end of the tube 6 and its associated fairing and the neck 14 snugly grips upon the top end of the tube 7 and its associated fairing while the pleated body encloses the stuffing box 8 and adjacent portions of said tubes.

Thus in the relative movement of said tube parts in landing, taxiing or taking off, the pleated body unfolds and folds to either elongate or foreshorten as the tube parts move relatively outward or inward and this without changing the stream line cross section of the boot.

With the necks of the boot engaged upon the tubes as described, it is apparent that the stuffing box 8 is enclosed and protected against the entrance of any foreign matter.

While in describing the invention, I have referred in detail to the form and arrangement of the parts thereof, the same is to be considered merely as illustrative so that I do not wish to be limited thereto except as may be specifically set forth in the appended claims.

I claim as my invention:—

1. In an airplane, a strut including a pair of members capable of a relatively telescopic movement, the one within the other and each having a stream line cross section, a flexible boot having a similar cross section and including end necks and a pleated intermediate body, said necks being formed for a stretched on attachment to one end of one member and a part of the other member.

2. In an airplane, a strut comprising two members each including a tube and a fairing, with one tube telescopic in the other tube and with the fairing imparting a stream line cross section thereto, a flexible boot of a cross section corresponding to that of said tubes and fairing and having end portions adapted for a stretched on engagement with adjacent parts of both members and having an intermediate pleated portion of a similar cross section whereby said boot may expand and contract to accommodate the relative movement between said members without losing its cross sectional stream line shape.

3. A boot of the kind described comprising a tube of flexible material of a stream line cross section, said boot having a circumferentially pleated body and unpleated stretchable end portions to grip with a contracting action upon associated portions of an airplane.

4. A boot of the kind described comprising a tube of rubber having a stream line cross section and including a circumferentially pleated body and unpleated stretchable end portions to grip with a contracting action upon associated portions of an airplane.

5. A boot for the purpose described comprising a tube of rubber having a stream line cross section, said boot having a circumferentially pleated body and being adapted to maintain said stream line cross section within the limits of expansion and contraction for which it is designed.

In testimony whereof, I have hereunto set my hand, this 4th day of September, 1930.

KENNETH M. ROHAN.